(12) United States Patent
Ochi et al.

(10) Patent No.: US 8,378,220 B2
(45) Date of Patent: Feb. 19, 2013

(54) ELECTRONIC DEVICE, WASHER AND METHOD FOR MANUFACTURING WASHER

(75) Inventors: Yoshiteru Ochi, Kawasaki (JP); Nobutaka Itoh, Kawasaki (JP); Makoto Sakairi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/887,594

(22) Filed: Sep. 22, 2010

(65) Prior Publication Data

US 2011/0085305 A1 Apr. 14, 2011

(30) Foreign Application Priority Data

Oct. 14, 2009 (JP) .................................. 2009-237489

(51) Int. Cl.
| H05K 7/14 | (2006.01) |
| H05K 7/12 | (2006.01) |
| H05K 7/02 | (2006.01) |
| H01R 4/70 | (2006.01) |
| B23P 11/02 | (2006.01) |
| B23P 17/04 | (2006.01) |
| F16B 43/00 | (2006.01) |
| B21D 53/20 | (2006.01) |

(52) U.S. Cl. ............. 174/138 D; 174/138 F; 174/138 G; 29/446; 29/447; 29/449; 29/592; 361/807; 361/809; 361/810; 411/531; 411/533; 470/41

(58) Field of Classification Search .................. 361/753, 361/807–810; 174/138 D, 138 F, 138 G; 439/63; 470/32, 41; 337/38; 411/544, 546, 411/531, 533; 29/446, 447, 449, 452, 592, 29/825, 835, 839, 843, 860, 861
See application file for complete search history.

(56) References Cited

U.S. PATENT DOCUMENTS

| 3,317,888 | A | * | 5/1967 | Mancini | 439/862 |
| 3,792,400 | A | * | 2/1974 | Hayes et al. | 337/38 |
| 4,495,380 | A | * | 1/1985 | Ryan et al. | 174/138 D |
| 4,674,910 | A | * | 6/1987 | Hayashi | 403/408.1 |
| 4,901,204 | A | * | 2/1990 | Hayashi | 361/807 |
| 5,191,513 | A | * | 3/1993 | Sugiura et al. | 361/752 |
| 6,344,972 | B2 | * | 2/2002 | Estieule et al. | 361/753 |
| 7,088,297 | B2 | * | 8/2006 | Nakano et al. | 343/713 |
| 2008/0232072 | A1 | * | 9/2008 | Edwards et al. | 361/759 |

FOREIGN PATENT DOCUMENTS

| JP | 2509235 U | 8/1996 |
| JP | 2001-105310 A | 4/2001 |
| JP | 2005-239049 A | 9/2005 |

* cited by examiner

*Primary Examiner* — Timothy Thompson
*Assistant Examiner* — Sherman Ng
(74) *Attorney, Agent, or Firm* — Fujitsu Patent Center

(57) ABSTRACT

An electronic device includes, a circuit board including a through hole, a member including a screw hole, a screw including a screw body having an outer diameter smaller than an inner diameter of the through hole and a screw head having an outer diameter larger than the inner diameter of the through hole, wherein the screw body penetrates through the through hole to engage with the screw hole and the screw head is disposed on an opposite side of the circuit board to the member, and a first washer provided between the screw head and the circuit board, the first washer including a first washer body and a plurality of first washer legs extending from the first washer body toward the circuit board, the first washer legs being in contact with the circuit board and having a characteristic of reducing stress on the circuit board upon being heated.

13 Claims, 13 Drawing Sheets

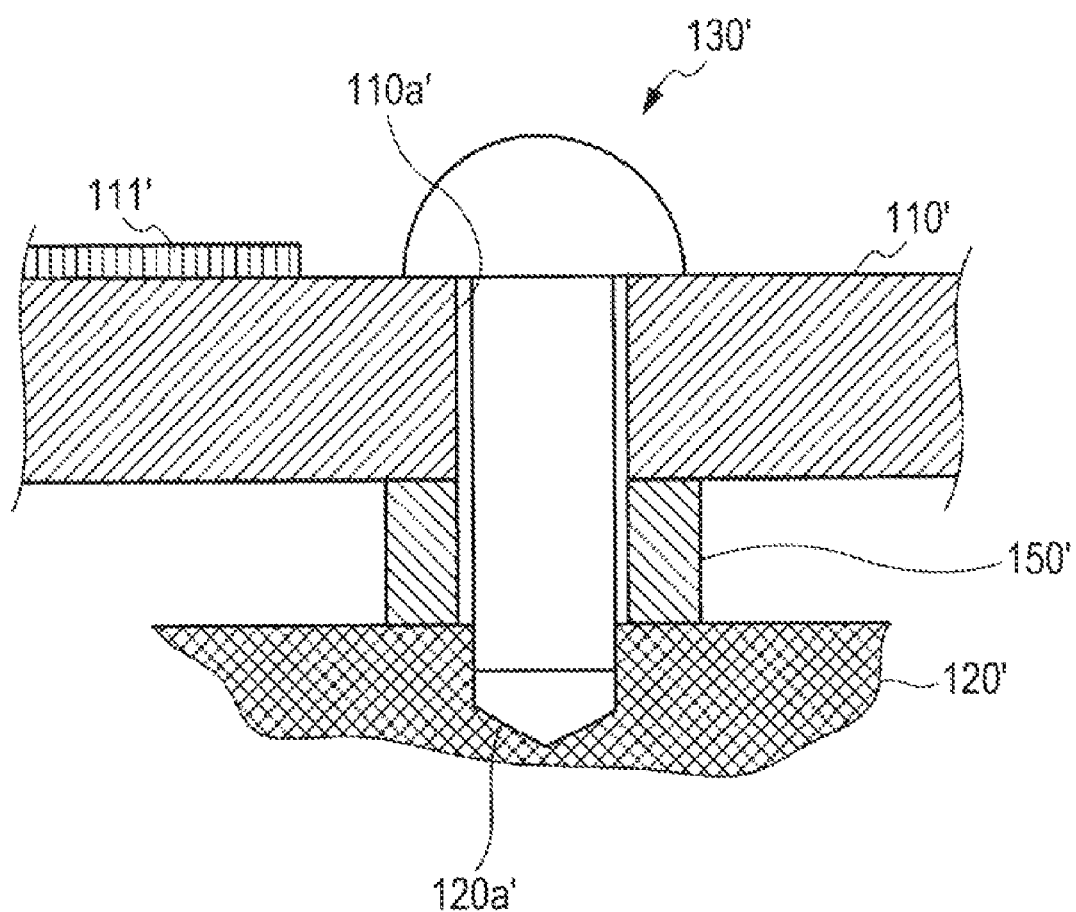

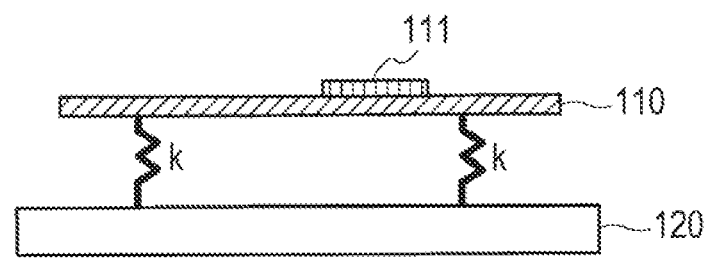
FIG. 10A
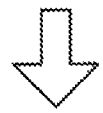
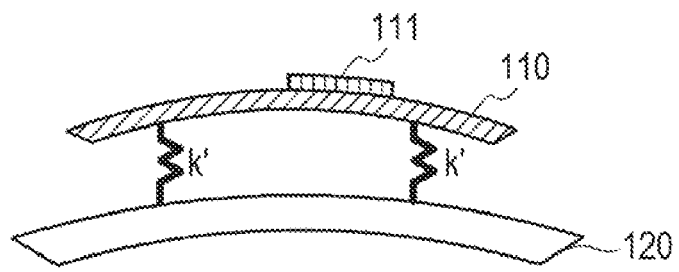
FIG. 10B

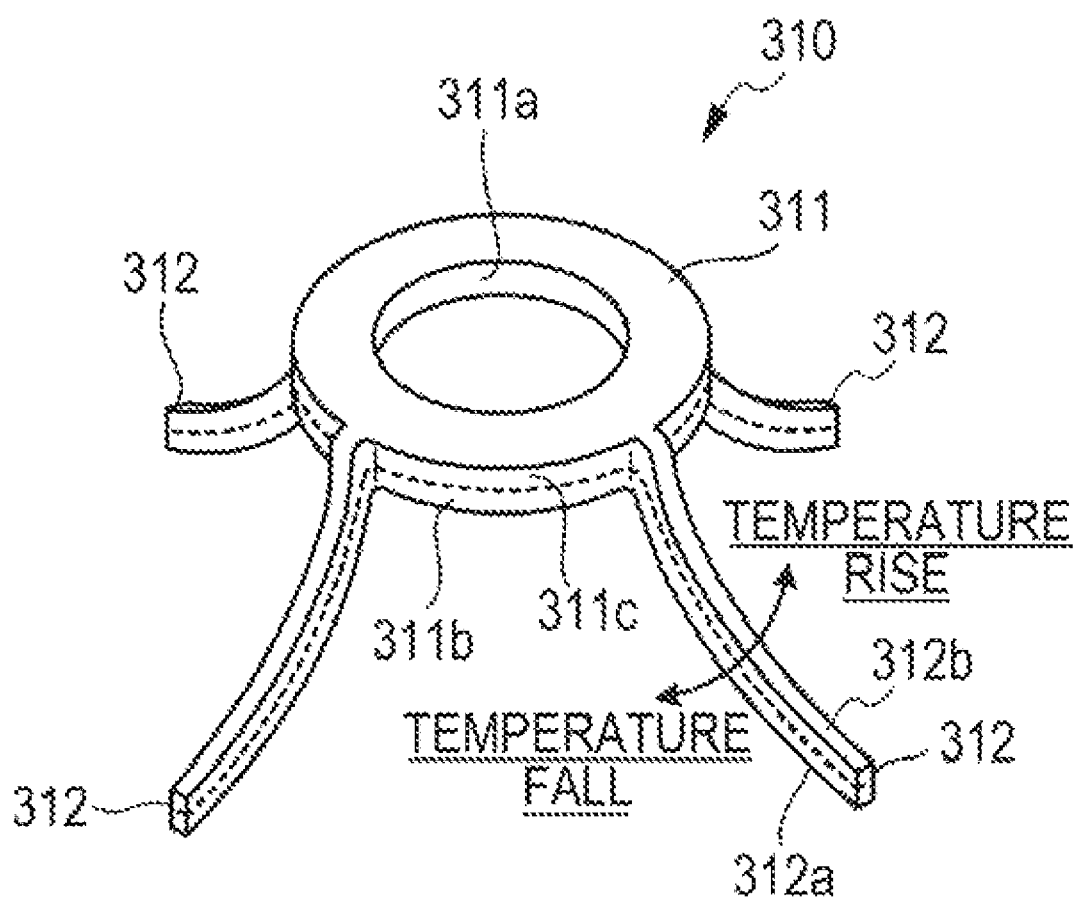

ELECTRONIC DEVICE, WASHER AND METHOD FOR MANUFACTURING WASHER

CROSS-REFERENCE TO RELATED APPLICATIONS

This application is based upon and claims the benefit of priority of the prior Japanese Patent Application No. 2009-237489, filed on Oct. 14, 2009, the entire contents of which are incorporated herein by reference.

FIELD

The embodiments discussed herein are related to an electronic device in which a circuit board is screw-fastened to a casing, a washer used for the screw-fastening of the circuit board in the electronic device, and a method for manufacturing the washer.

BACKGROUND

Screw-fastening is commonly used to fix components to a casing (for example, see Japanese Registered Utility Model No. 2509235, and Japanese Laid-Open Patent Publications No. 2001-105310 and No. 2005-239049).

In an electronic device in which a circuit board is installed in a metal casing, the circuit board is often screw-fastened to the casing. In such an electronic device, the circuit board and the casing are often subject to temperature load resulting from, for example, heat generated during operation of the electronic components mounted on the circuit board. The circuit board, which is often made of resin or the like, has a coefficient of thermal expansion larger than that of the metal casing. Under the temperature load, an elastic deformation of the circuit board which has a relatively large coefficient of thermal expansion is suppressed by the metal casing which has a relatively small coefficient of thermal expansion. As a result, a distortion (for example, warpage) may occur in the circuit board. Such a distortion may cause damage to, for example, soldered joints between the electronic components and the circuit board.

SUMMARY

According to an aspect of an embodiment, an electronic device includes, a circuit board including a through hole passing through the circuit board, a member including a screw hole corresponding to the through hole, a screw including a screw body having an outer diameter smaller than an inner diameter of the through hole and a screw head having an outer diameter larger than the inner diameter of the through hole, wherein the screw body penetrates through the through hole to engage with the screw hole and the screw head is disposed on an opposite side of the circuit board to the member, and a first washer provided between the screw head and the circuit board, the first washer including a first washer body and a plurality of first washer legs extending from the first washer body toward the circuit board, the first washer legs being in contact with the circuit board and having a characteristic of reducing stress on the circuit board from the first washer legs upon being heated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a sectional view of one of screw-fastening positions at which a circuit board is fixed to a casing in an electronic device of Comparative Example.

FIGS. 10A and 10B schematically illustrate suppression of the occurrence of a distortion in the circuit board due to temperature load in the present embodiment.

FIG. 14 is a perspective view of a first legged washer.

DESCRIPTION OF EMBODIMENTS

Hereinafter, embodiments of an electronic device, a washer and a method for manufacturing the washer will be described with reference to the drawings.

First, an electronic device and a washer of a first embodiment will be described.

Figure 1:
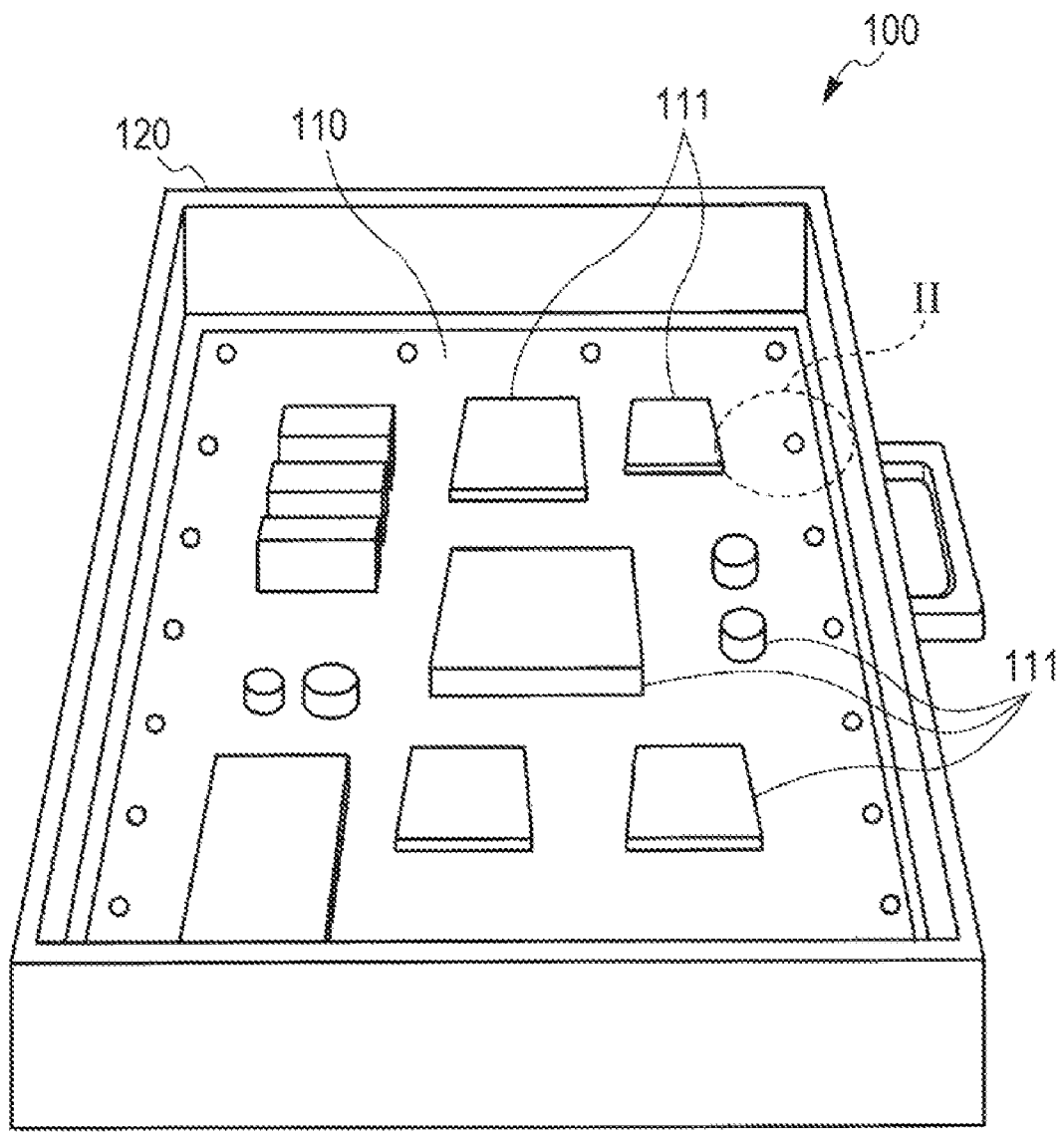
FIG. 1 is a schematic perspective view of an electronic device according to a first embodiment.

FIG. 1 is a schematic perspective view of an electronic device according to the first embodiment.

FIG. 1 illustrates an electronic device 100 in which a circuit board 110 having a plurality of electronic components 111 mounted thereon is installed. In the electronic device 100, the circuit board 110 is screw-fastened to a metal casing 120 at a plurality of positions in a following manner.

Figure 2A:
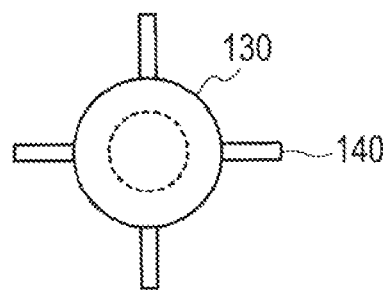
FIG. 2A is a plan view of one of screw-fastening positions in an area II indicated by a dotted line in FIG. 1.
Figure 2B:
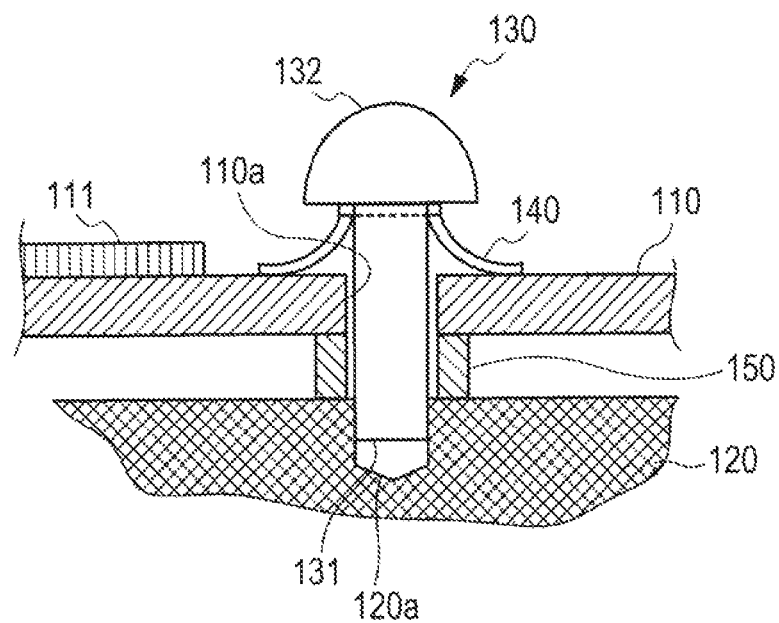
FIG. 2B is a sectional view of one of screw-fastening positions in an area II indicated by a dotted line in FIG. 1.

FIG. 2A is a plan view of one of the screw-fastening positions in an area II indicated by a dotted line in FIG. 1. FIG. 2B is a sectional view of one of the screw-fastening positions in an area II indicated by a dotted line in FIG. 1.

As illustrated in FIG. 2B, in the first embodiment, the circuit board 110 having the electronic components 111 mounted thereon includes through holes 110a for the screw-fastening. The casing 120 includes screw holes 120a for the screw-fastening of the circuit board 110.

The circuit board 110 is screw-fastened to the casing 120 with screws 130 which will be described below. Each of the screws 130 includes a screw body 131 and a head 132. The screw body 131 is threaded to be screwed into one of the screw holes 120a of the casing 120 and has a diameter which is smaller than a hole diameter of the through hole 110a of the circuit board 110. The head 132 has a diameter which is larger than the hole diameter of the through hole 110a. The screw body 131 is screwed into one of the screw holes 120a of the casing 120 via a cylindrical member 150 disposed between the circuit board 110 and the casing 120.

A first legged washer 140, which will be described later, is disposed between the head 132 of the screw 130 and the circuit board 110.

Figure 3:
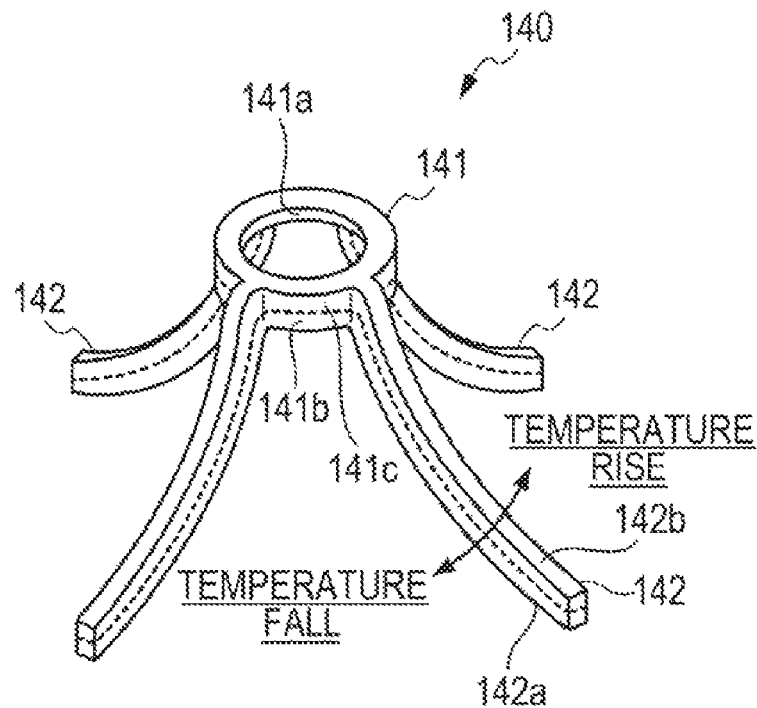
FIG. 3 is a perspective view of a first legged washer.

FIG. 3 is a perspective view of the first legged washer.

As illustrated in FIG. 3, the first legged washer 140 includes a washer body 141 and four legs 142.

The washer body 141 is constituted by a disc-shaped plate which has a penetration hole 141a.

All the four legs 142, which surround the penetration hole 141a, extend from one of the front and back surfaces of the washer body 141 and curve in directions away from the penetration hole 141a. That is to say, the legs 142 extend from the washer body 141 so that each of the legs 142 get farther from an axis of the washer body 141 with increasing a distance from the washer body 141. The axis of the washer 141 body passes through the penetration hole 141a in a direction perpendicular to the washer body 141.

The first legged washer 140 illustrated in FIG. 3 is a sheet metal product manufactured in a process which will be described later. Each of the four legs 142 is bent at a boundary with the washer body 141.

As illustrated in FIG. 2B, in the first embodiment, the first legged washer 140 is placed on the circuit board 110 at the side on which the electronic components 111 are mounted. Here, the four legs 142 of the first legged washer 140 face the circuit board 110. The screw body 131 of the screw 130 is placed in the penetration hole 141a of the washer body 141.

In the first embodiment, the screw 130 is tightened with predetermined tightening torque. With the torque, the head 132 of the screw 130 presses the first legged washer 140 against the circuit board 110. The legs 142 of the first legged washer 140 are press-bent in a direction away from the penetration hole 141a from their positions before the screw 130 is tightened. The thus press-bent legs 142 apply spring force to between the head 132 of the screw 130 and the circuit board 110. The spring force presses the circuit board 110 against the casing 120. In this manner, the circuit board 110 is fixed to the casing 120 with predetermined force. In the first embodiment, the first legged washer 140 has four legs 142 for the well-balanced generation of the spring force. It is possible, however, to generate the spring force in a well-balanced manner by three or more legs 142. Thus, three legs 142, or five or more legs 142 may also be employed.

The four legs 142 of the first legged washer 140 illustrated in FIG. 3 will be further bent as the temperature rises.

Such a deformation of the legs 142 due to the temperature rise occurs because the legs 142 have a bimetal structure which will be described below. In the first embodiment, each of the legs 142 includes a SUS (Stainless Used Steel) layer 142a on the penetration hole 141a side and an invar layer 142b on the side opposite to the penetration hole 141a. Invar has the coefficient of thermal expansion (which is about 1.2 ppm/degrees. C in the coefficient of linear expansion) that is smaller than the coefficient of thermal expansion (which is about 10 ppm/degrees. C in the coefficient of linear expansion) of SUS. Thus, as the temperature rises, the legs 142 will further be bent toward the invar layer 142b side which has the smaller coefficient of thermal expansion. That is to say, the legs 142 have a characteristic of reducing stress on the circuit board 110 from the legs 142 upon heating the legs 142.

Note that the bimetal structure is not limited to those described above constituted by the invar layer and the SUS layer, and may be constituted by other metal layers.

In the first embodiment, since the first legged washer 140 is obtained by sheet metal working as described above, the washer body 141 also has a bimetal structure similar to those of the legs 142. In particular, the washer body 141 includes a SUS layer 141b on the lower side and an invar layer 141c on the upper side of FIG. 3. The washer body 141 deforms to protrude downward in FIG. 3 when the temperature rises. However, the deformation of the washer body 141 is negligibly small because it has a configuration that is not easily deformed as compared with the legs 142 and because the deformation of the washer body 141 is suppressed by the head 132 of the screw 130 as illustrated in FIG. 2B.

For ease of description, the deformation of the washer body 141 will not be explained and the description will be continued on the deformation of the four legs.

Figure 4:
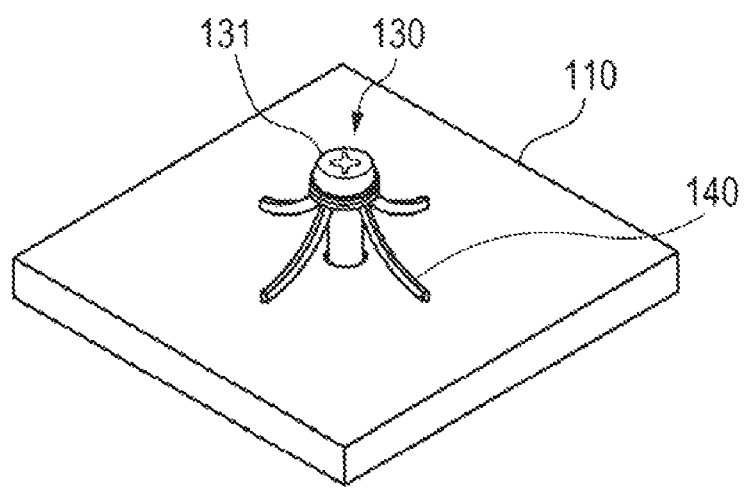
FIG. 4 illustrates a simulation model for the deformation of four legs with the temperature rise.

FIG. 4 illustrates a simulation model for the deformation of four legs with the temperature rise.

In this simulation, numerical models of the screw 130 and the circuit board 110 illustrated in FIG. 2B, and the first legged washer 140 illustrated in FIGS. 2B and 3 are used. In the following description, these numerical models and actual components, i.e., the screw 130, the circuit board 110 and the first legged washer 140, will not be distinguished from each other.

In the simulation model, the circuit board 110 is screw-fastened to the casing 120 with the screw 130 via the first legged washer 140 disposed between the circuit board 110 and the casing 120. The temperature of the model is raised.

Figure 5:
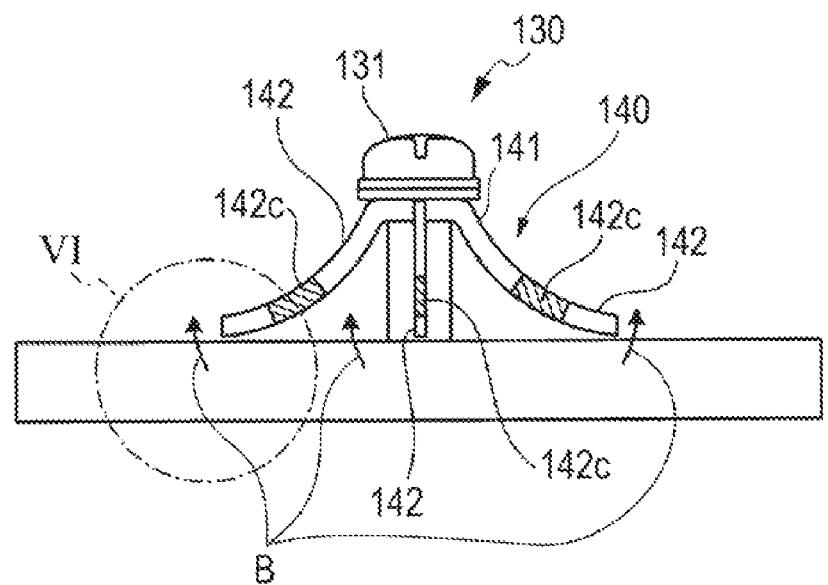
FIG. 5 illustrates a state in which the legs of a legged washer deformed after the temperature rose in the simulation.

FIG. 5 illustrates a state in which the legs of a legged washer deformed after the temperature rose in the simulation.

FIG. 5 illustrates a simulation result of the model of FIG. 4 in a sectional view. As the temperature rises, stress is generated in each of the legs 142 at a position 142c slightly further toward a distal end than a central portion. The stress is caused due to the difference in the coefficient of thermal expansion of the SUS layer 142a and the invar layer 142b in the legs 142 of the first legged washer 140. With the stress, the legs 142 deform in the direction indicated by arrows B in FIG. 5.

Figure 6:
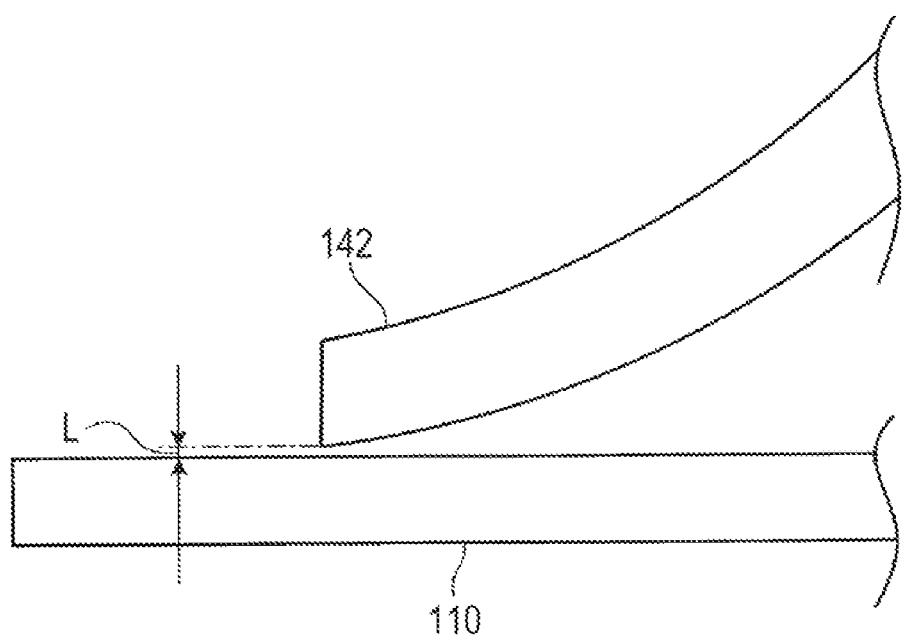
FIG. 6 is an enlarged view of a distal end of one of the legs in an area VI indicated by a dashed dotted line in FIG. 5.

FIG. 6 is an enlarged view of a distal end of one of the legs in an area VI indicated by a dashed dotted line in FIG. 5.

In this simulation, for ease of illustration of the deformation result, the screw 130 of the model illustrated in FIG. 5 is tightened with the tightening torque that is much smaller than that required for actual fixation of the circuit board 110. Thus, in this model, the legs 142 of the first legged washer 140 are not press-bent by the tightened screw 130. In this model, the first legged washer 140 is fixed to a position at which the washer body 141 is made to abut against the head 132 of the screw 130. Thus, in this simulation, the deformation of the legs 142 causes the distal ends of the legs 142 to lift up from the circuit board 110 by a small amount of L as illustrated in FIG. 6.

In the actual fixation of the circuit board 110 as illustrated in FIG. 2B, since the screw 130 is tightened in a manner described above, the legs 142 of the first legged washer 140 are pressed against the circuit board 141 while being press-bent in the direction away from the penetration hole 141*a*. With the spring force generated by the press-bent legs 142, the circuit board 110 is fixed to the casing 120 with predetermined force.

Now, it is considered that the temperature is raised in such an actual structure. In this case, the screw 130 causes the distal ends of the legs 142 to be pressed against the circuit board 110. With this, unlike the simulation, the distal ends of the legs 142 do not lift up and the shape of the legs 142 apparently unchanged. However, stress that may deform the legs 142 has been generated in the legs 142 due to the difference in the coefficient of thermal expansion of the SUS layer 142*a* and the invar layer 142*b*. The stress decreases the spring force with which the circuit board 110 is fixed to the casing 120.

This means that, in the first embodiment, as the temperature of the first legged washer 140 rises as described above in each of the screw-fastening positions at which the circuit board 110 is fixed to the casing 120, the fixing force decreases in each of the screw-fastening positions and thus the circuit board 110 becomes easier to move with respect to the casing 120.

In the electronic device 100 of FIG. 1, the circuit board 110 and the casing 120 are often subject to temperature load resulting from, for example, heat generated during operation of the electronic components 111 mounted on the circuit board 110. As a result, the temperature of the first legged washer 140 in each of the screw-fastening positions rises. Then, since the spring force in the legs 142 decreases as the temperature rises, the fixing force decreases in each of the screw-fastening positions and thus the circuit board 110 becomes easier to move with respect to the casing 120.

With this, according to the first embodiment, a distortion in a circuit board can be suppressed when the temperature load is applied as described above to an electronic device of Comparative Example which will be described below in which a circuit board is screw-fastened to a casing.

The electronic device of Comparative Example described below is similar to that of the present embodiment except for a structure of the screw-fastening positions at which the circuit board is fixed to the casing. Hereinafter, the electronic device of Comparative Example will be described, focusing on the difference from the first embodiment. Description about the overall structure of the electronic device of Comparative Example will be omitted.

FIG. 7 is a sectional view of one of screw-fastening positions at which a circuit board is fixed to a casing in the electronic device of Comparative Example.

As illustrated in FIG. 7, in the electronic device of Comparative Example, a circuit board 110' having electronic components 111' mounted thereon includes through holes 110*a*' for the screw-fastening. The metal casing 120' includes screw holes 120*a*' for the screw-fastening of the circuit board 110'.

A screw 130' is screwed into each of the screw holes 120*a*' of the casing 120' via a cylindrical member 150' disposed between the circuit board 110' and the casing 120' to screw-fasten the circuit board 110' to the casing 120'.

The circuit board 110', which is often made of resin or the like, has a coefficient of thermal expansion different from that of the metal casing 120'. Thus, under the temperature load as described above, an elastic deformation of the circuit board 110' which has a relatively large coefficient of thermal expansion is suppressed by the metal casing 120' to which the circuit board 110' is firmly screw-fastened. As a result, a distortion may occur in the circuit board 110' as described below.

Figure 8A:
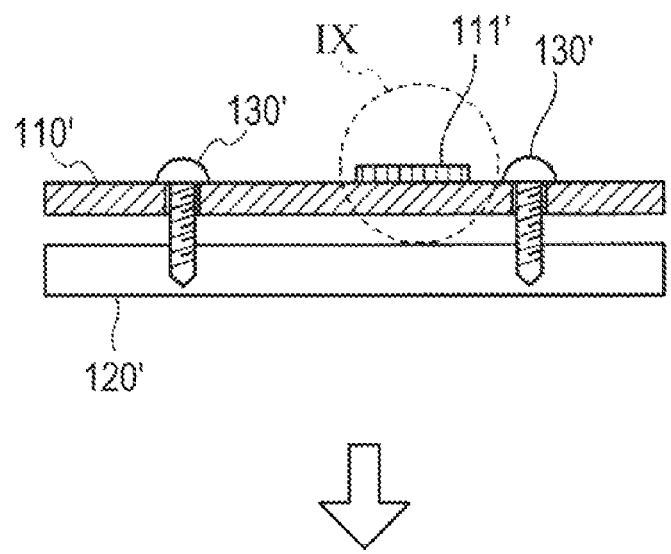
FIGS. 8A and 8B schematically illustrate the occurrence of a distortion in a circuit board due to temperature load applied to an electronic device of Comparative Example.
Figure 8B:
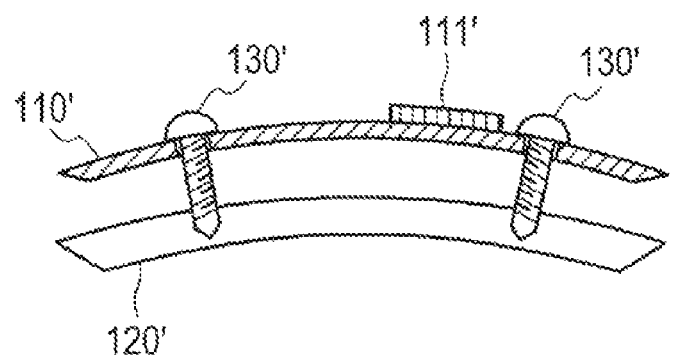

FIGS. 8A and 8B schematically illustrate the occurrence of a distortion in a circuit board due to temperature load applied to an electronic device of Comparative Example.

FIG. 8A is a sectional view of the circuit board 110' and the casing 120' at normal temperatures. FIG. 8B is a sectional view of the circuit board 110' and the casing 120' under the application of temperature load.

In a state in which an elastic deformation of the circuit board 110' is suppressed by the metal casing 120' as described above, a distortion, such as warpage, may occur in the circuit board 110'. For example, the circuit board 110' deforms to protrude on the side opposite to the casing 120' as illustrated in FIG. 8B. The distortion tends to become severer in the vicinity of the screw-fastening positions. The distortion of the circuit board 110' affects joints between the electronic components 111' and the circuit board 110' in the following manner.

Recently, many electronic components 111' have been made from, for example, ball grid array (BGA) components, which are especially vulnerable to the distortion of the circuit board 110'.

Figure 9:
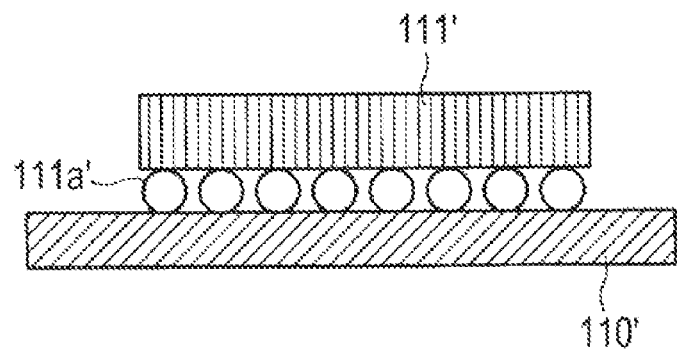
FIG. 9 is an enlarged view of an area IX indicated by a dotted line in FIG. 8A assuming that the electronic component illustrated in FIG. 8A is a BGA component.

FIG. 9 is an enlarged view of an area IX indicated by a dotted line in FIG. 8A assuming that the electronic component illustrated in FIG. 8A is a BGA component.

As illustrated in FIG. 9, a BGA electronic component 111' includes a plurality of ball-shaped terminals 111*a*' for the joint to the circuit board 110'.

The terminals 111*a*' are soldered to a surface of the circuit board 110'. In this structure, when a distortion occurs in the circuit board 110' as described above, severe stress to separate the terminals 111*a*' from the circuit board 110' will be applied to the joints between the terminals 111*a*' and the circuit board 110'. Such stress may cause damage or the like to the joints between the electronic components 111' and the circuit board 110'.

Unlike Comparative Example, in the first embodiment, when the circuit board 110 and the casing 120 are subject to the temperature load, the fixing force at the screw-fastening positions of the circuit board 110 decreases and thus the circuit board 110 becomes easier to move with respect to the casing 120 as described above. In the first embodiment, it is possible to reduce a degree of suppression of the elastic deformation of the circuit board 110 by the casing 120 under the temperature load. As a result, the occurrence of a distortion in the circuit board 110 as described above will be suppressed.

FIGS. 10A and 10B schematically illustrate suppression of the occurrence of a distortion in the circuit board due to temperature load in the first embodiment.

FIG. 10A is a sectional view of the circuit board 110 and the casing 120 at normal temperatures in the first embodiment. FIG. 10B is a sectional view of the circuit board 110 and the casing 120 under the temperature load in the first embodiment.

Instead of the screw-fastening structures illustrated in FIGS. 2A and 2B, FIGS. 10A and 10B schematically illustrate the spring force generated by the legs 142 of the first legged washer 140. The spring force contributes to the fixation of the circuit board 110 to the casing 120. As described above, the spring force decreases under the temperature load. That is, if the spring force at normal temperatures is denoted by "k" and the spring force under the temperature load is denoted by "k'," then their relationship is "k>k'." As a result, the circuit board 110 becomes easier to move with respect to the casing 120 under the temperature load and, moreover, is easier to elastically deform without being suppressed by the metal casings 120. Such a configuration suppresses the distortion of the circuit board 110 that may cause damage or the like to the joints between the electronic components 111 and the circuit board 110 as described above.

As described above, the legs 142 of the first legged washer 140 in the first embodiment have a following bimetal structure. Each of the legs 142 includes a SUS layer 142a on the penetration hole 141a side of the washer body 141 and an invar layer 142b on the side opposite to the penetration hole 141a. Since the coefficient of thermal expansion of invar is smaller than that of SUS, the spring force decreases effectively from the legs 142 under the temperature load.

This indicates that an application described below is preferable. In this application, each of the legs of the washer includes a layer of a first metallic material which has a first coefficient of thermal expansion on the penetration hole side of the washer body and a layer of a second metallic material which has a second coefficient of thermal expansion that is smaller than the first coefficient of thermal expansion on the side opposite to the penetration hole.

The legs 142 of the first legged washer 140 of the first embodiment correspond also to one exemplary legs of this application. The SUS layer 142a in each of the legs 142 of the first embodiment corresponds to one exemplary layer of the first metallic material of this application. The invar layer 142b in each of the legs 142 of the first embodiment corresponds to one exemplary layer of the second metallic material of this application.

In the first embodiment, the first legged washer 140 illustrated in FIG. 3 is a sheet metal product as described above. Thus, the first legged washer 140 illustrated in FIG. 3 can be manufactured in a simple process, such as sheet metal working.

This indicates that an application in which the first washer described above is a sheet metal product is preferable.

The first legged washer 140 of the first embodiment corresponds also to one exemplary first washer of this application.

Next, an electronic device and a washer of a second embodiment will be described.

The electronic device of the second embodiment described below is similar to that of the first embodiment except for the screw-fastening positions at which the circuit board is fixed to the casing. Hereinafter, the electronic device of the second embodiment will be described, focusing on the difference from the first embodiment. Illustration and description about the overall structure of the electronic device of the second embodiment will be omitted.

Figure 11A:
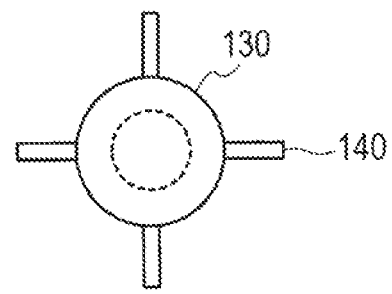
FIG. 11A is a plan view of one of screw-fastening positions at which a circuit board is fixed to a casing in an electronic device of a second embodiment.
Figure 11B:
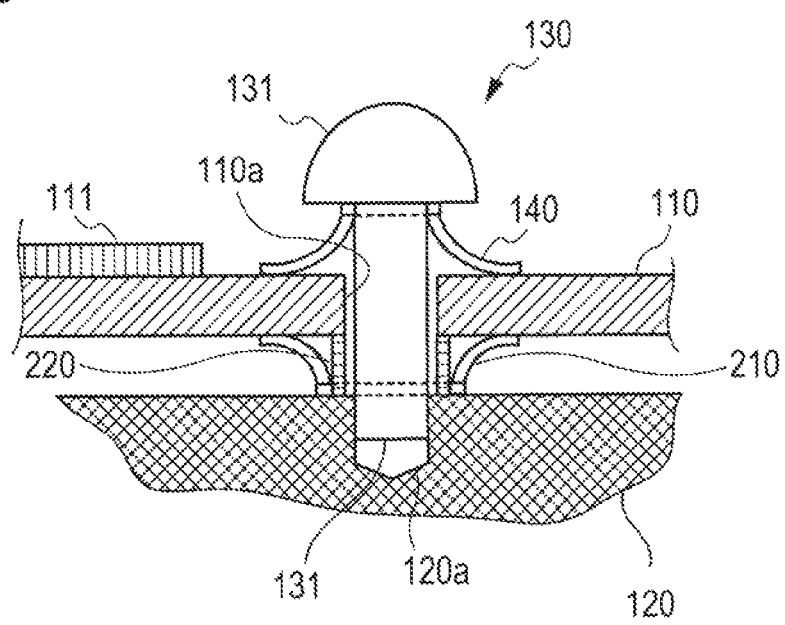
FIG. 11B is sectional view of one of screw-fastening positions at which a circuit board is fixed to a casing in an electronic device of a second embodiment.

FIG. 11A is a plan view of one of screw-fastening positions at which a circuit board is fixed to a casing in an electronic device of the second embodiment. FIG. 11B is a sectional view of one of screw-fastening positions at which a circuit board is fixed to a casing in an electronic device of the second embodiment.

Components equivalent to those of the first embodiment illustrated in FIG. 2B are denoted by the same reference numerals in FIG. 11B and description thereof will be omitted.

In the second embodiment, a second legged washer 210 is disposed between a circuit board 110 and a casing 120.

Figure 12:
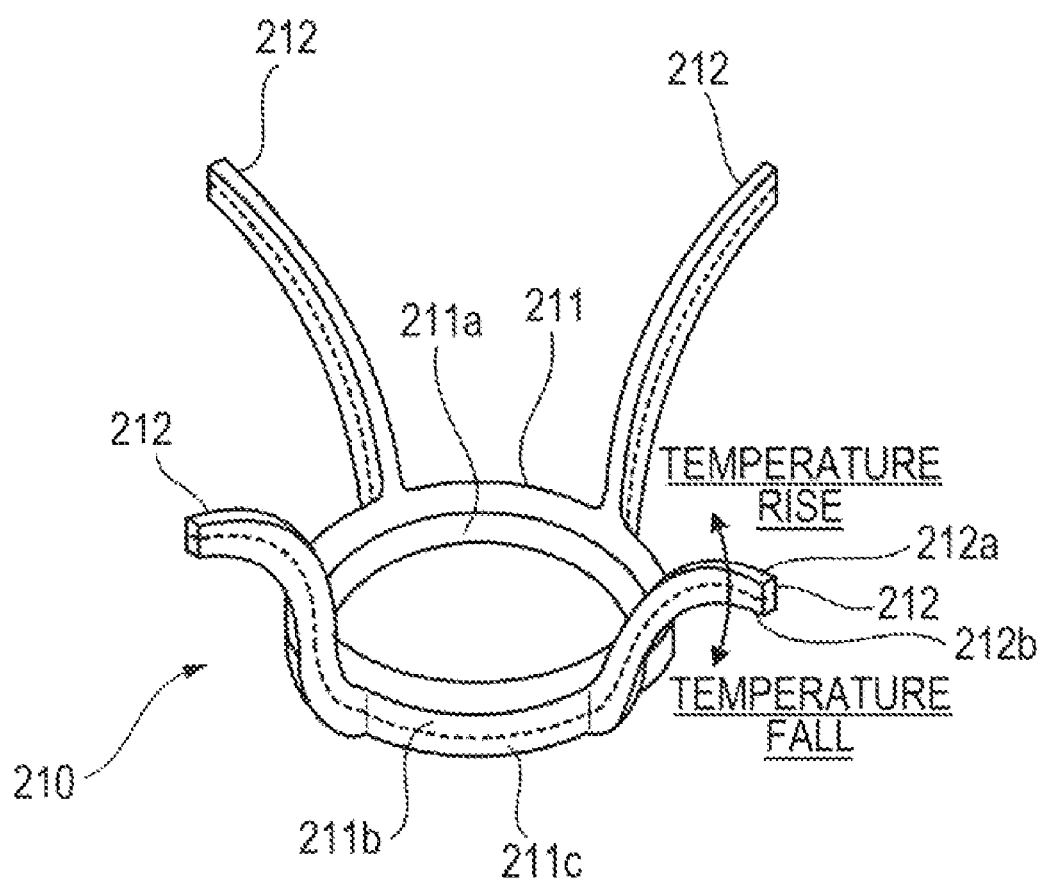
FIG. 12 is a perspective view of a second legged washer.

FIG. 12 is a perspective view of the second legged washer.

As illustrated in FIG. 12, the second legged washer 210 also includes a washer body 211 and four legs 212.

The washer body 211 is constituted by a disc-shaped plate which has a penetration hole 211a. A first spacer 220 (see FIG. 11B), which will be described later, will be inserted through the penetration hole 211a.

All the four legs 212, which surround the penetration hole 211a, extend from one of the front and back surfaces of the washer body 211 and curve in directions away from the penetration hole 211a. That is to say, the legs 212 extend from the washer body 211 so that each of the legs 212 get farther from an axis of the washer body 211 with increasing a distance from the washer body 211. The axis of the washer 211 body passes through the penetration hole 211a in a direction perpendicular to the washer body 211.

Like the first legged washer 140, the second legged washer 210 illustrated in FIG. 12 is also a sheet metal product. Each of the four legs 212 is bent at a boundary with the washer body 211.

Unlike the legs 142 of the first legged washer 140 described above, the four legs 212 of the second legged washer 210 illustrated in FIG. 12 restore their bent configurations in the direction toward the penetration hole 211a as the temperature rises.

Such a deformation of the legs 212 due to the temperature rise occurs because the legs 212 have a bimetal structure which will be described below.

In the second legged washer 210, each of the legs 212 includes an invar layer 212a on the penetration hole 211a side and a SUS layer 212b on the side opposite to the penetration hole 211a. As described above, invar has the coefficient of thermal expansion which is smaller than that of SUS. As the temperature rises, the SUS layer 212a extends over the invar layer 212a, whereby the legs 212 restore their bent configurations in the direction toward the penetration hole 211a as described above. That is to say, the legs 212 have a characteristic of increasing stress on the circuit board 110 from the legs 212 upon heating the legs 212.

In the second embodiment, since the second legged washer 210 is obtained by processing a sheet metal like in the first embodiment as described above, the washer body 211 has a bimetal structure similar to those of the legs 212. The washer body 211 includes an invar layer 211b on the upper side and a SUS layer 211c on the lower side of FIG. 12. However, in the second legged washer 210, the deformation of the washer body 211 due to the bimetal structure thereof as the temperature rises is negligibly small as in the first legged washer 140.

As illustrated in FIG. 11B, in the second embodiment, the second legged washer 210 is disposed between the circuit board 110 and the casing 120 with the four legs 212 thereof facing the circuit board 110. A cylindrical-shaped first spacer 220, which has passed through the penetration hole 211a of the washer body 211, is disposed between the circuit board 110 and the casing 120.

The screw body 131 of the screw 130 is inserted in the penetration hole 141a of the washer body 141 of the first legged washer 140 and then in the through hole 110a of the circuit board 110. The first legged washer 140 is placed on the circuit board 110 on a surface on which the electronic components 111 are mounted. The screw body 131 is inserted through the first spacer 220 and is screwed into one of the screw holes 120a of the casing 120.

The screw 130 is tightened with predetermined tightening torque. Thus, the legs 142 of the first legged washer 140 exert spring force to press the circuit board 110 against the casing 120.

The legs 212 of the second legged washer 210 exert spring force to move the circuit board 110 upward on the side opposite to the casing 120, i.e., a direction opposite to the spring force of the legs 142 of the first legged washer 140, when the screw 130 is tightened. In the second embodiment, it is not possible to shorten a distance between the circuit board 110 and the casing 120 to become smaller than the height of the first spacer 220 disposed between the circuit board 110 and the casing 120 even after the screw 130 is tightened to the maximum. With this, a deformation of the legs 212 of the second legged washer 210 caused by the tightened screw 130 is restricted. Thus, the spring force exerted by the legs 212 of the second legged washer 210 is controlled within a constant value when the screw 130 is tightened.

Now, it is considered that the temperature will be raised in such a structure. In this case, the spring force exerted by the legs 142 is reduced by the occurrence of stress that attempts to further bend the legs 142 of the first legged washer 140. As the temperature rises, the legs 212 of the second legged washer 210 receive stress to deform the legs 212 in a direction opposite to the direction in which the legs 142 of the first legged washer 140 are deform. As a result, the spring force exerted by the legs 212 of the second legged washer 210 is increased unlike in the legs 142 of the first legged washer 140.

Thus, in the second embodiment, a decrease in the spring force in the legs 142 of the first legged washer 140 is compensated by the increase in the spring force in the legs 212 of the second legged washer 210. However, a degree of the increase in the spring force in the legs 212 of the second legged washer 210 is controlled to be smaller than a degree of the decrease in the spring force in the legs 142 of the first legged washer 140 by the height of the first spacer 220.

Thus, in the second embodiment, an elastic deformation of the circuit board 110 is allowed due to the decrease in the spring force on the side of the first legged washer 140 as the temperature rises while a backlash of the circuit board 110 is effectively avoided by a proper increase in the spring force at the side of the second legged washer 210.

This indicates that an application described below is preferable. This application is provided with a second washer and a first spacer. The second washer is disposed between the circuit board and the casing. The second washer includes a washer body and three or more legs which will be described below. The washer body is constituted by a plate which has a penetration hole. All the three or more legs, which surround the penetration hole, extend from the washer body toward the circuit board and curve in directions away from the penetration hole. The screw body is inserted in the penetration hole of the washer body. The legs restore their bent configurations in the direction toward the penetration hole as the temperature rises. The first spacer, which is provided integrally with or separately from the casing, is disposed between the circuit board and the casing to keep their distance constant.

The second legged washer 210 of the second embodiment corresponds also to one exemplary second washer of this application. The washer body 211 of the second legged washer 210 corresponds to one exemplary washer body in this application. The four legs 212 of the second legged washer 210 correspond to exemplary three or more legs in this application. The first spacer 220 of the second embodiment corresponds to one exemplary first spacer in this application.

In the second embodiment, the second legged washer 210 has four legs 212 for the well-balanced generation of the spring force as in the legs 142 of the first legged washer 140. However, the number of the legs 212 is not limited to four and three legs 212, or five or more legs 212 may also be employed.

In the second embodiment, the exemplary first spacer in this application is provided separately from the casing 120, but the first spacer in the application is not limited to the same. The first spacer in this application may alternatively be provided integrally with the casing.

With the second embodiment described above, as in the first embodiment, it is possible to suppress the distortion of the circuit board 110 when the circuit board 110 and the casing 120 are subject to the temperature load.

Next, an electronic device and a washer of a third embodiment will be described.

The electronic device of the third embodiment described below is similar to that of the first embodiment except for the screw-fastening positions at which the circuit board is fixed to the casing. Hereinafter, the electronic device of the third embodiment will be described, focusing on the difference from the first embodiment. Description about the overall structure of the electronic device of the third embodiment will be omitted.

Figure 13A:
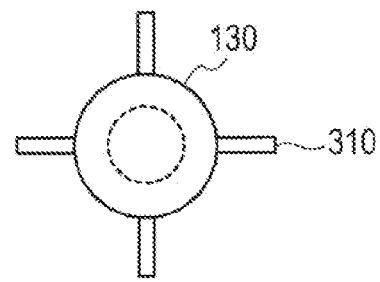
FIG. 13A is a plan view of one of screw-fastening positions at which a circuit board is fixed to a casing in an electronic device of a third embodiment.
Figure 13B:
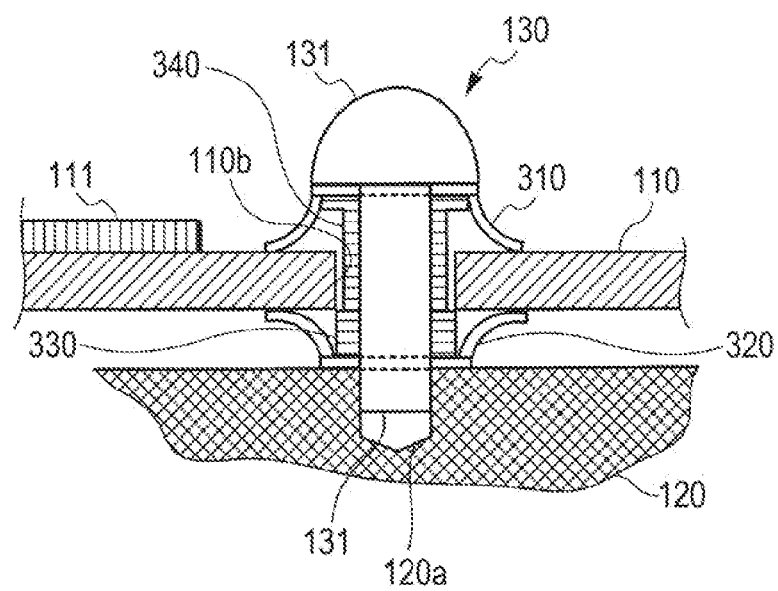
FIG. 13B is a sectional view of one of screw-fastening positions at which a circuit board is fixed to a casing in an electronic device of a third embodiment.

FIG. 13A is a plan view of one of screw-fastening positions at which a circuit board is fixed to a casing in an electronic device of a third embodiment. FIG. 13B is a sectional view of one of screw-fastening positions at which a circuit board is fixed to a casing in an electronic device of a third embodiment.

Components equivalent to those of the first embodiment illustrated in FIG. 2B are denoted by the same reference numerals in FIG. 13B and description thereof will be omitted.

In the third embodiment, as in the second embodiment, a first legged washer 310 is disposed between a head 131 of a screw 130 and a circuit board 110, and a second legged washer 320 is disposed between the circuit board 110 and a casing 120.

Further, a cylindrical-shaped lower spacer 330 is disposed between the second legged washer 320 and the circuit board 110, and a cylindrical-shaped upper spacer 340 is disposed between the lower spacer 330 and the head 131 of the screw 130.

An outer diameter of the upper spacer 340 is smaller than that of the lower spacer 330. The circuit board 110 includes a through hole 110b of which hole diameter is larger than the outer diameter of the upper spacer 340 and is smaller than the outer diameter of the lower spacer 330. The upper spacer 340 is inserted through the through hole 110b of the circuit board 110 and is made to abut against the lower spacer 330.

FIG. 14 is a perspective view of the first legged washer.

The first legged washer 310 includes a washer body 311 and four legs 312.

The washer body 311 is constituted by a disc-shaped plate which has a penetration hole 311a. In the third embodiment, as illustrated in FIG. 13B, an end of the upper spacer 340 on the upper side in FIG. 13B is made to abut against the washer body 311 of the first legged washer 310. Thus, the washer body 311 has a width which is large enough to receive the end of the upper spacer 340. The central penetration hole 311a has a hole diameter which is large enough to receive the screw body 131 of the screw 130.

All the four legs 312, which surround the penetration hole 311a, extend from one of the front and back surfaces of the washer body 311 and curve in directions away from the penetration hole 311a. That is to say, the legs 312 extend from the washer body 311 so that each of the legs 312 get farther from an axis of the washer body 311 with increasing a distance from the washer body 311. The axis of the washer 311 body passes through the penetration hole 311a in a direction perpendicular to the washer body 311.

The first legged washer 310 illustrated in FIG. 14 is also a sheet metal product.

Each of the legs 312 of the first legged washer 310 illustrated in FIG. 14 includes a SUS layer 312a on the penetration hole 311a side and an invar layer 312b on the side opposite to the penetration hole 311a. With this bimetal structure, the legs 312 will further be bent away from the penetration hole 311a as the temperature rises. That is to say, the legs 312 have a characteristic of reducing stress on the circuit board 110 from the legs 312 upon heating the legs 312.

In the third embodiment, since the first legged washer 310 is obtained by processing a sheet metal, the washer body 311 also has a bimetal structure similar to those of the legs 312. The washer body 311 has a SUS layer 311b on the lower side and an invar layer 311c on the upper side in FIG. 14. However, in the first legged washer 310, the deformation of the washer body 311 due to the bimetal structure thereof as the temperature rises is negligibly small.

Figure 15:
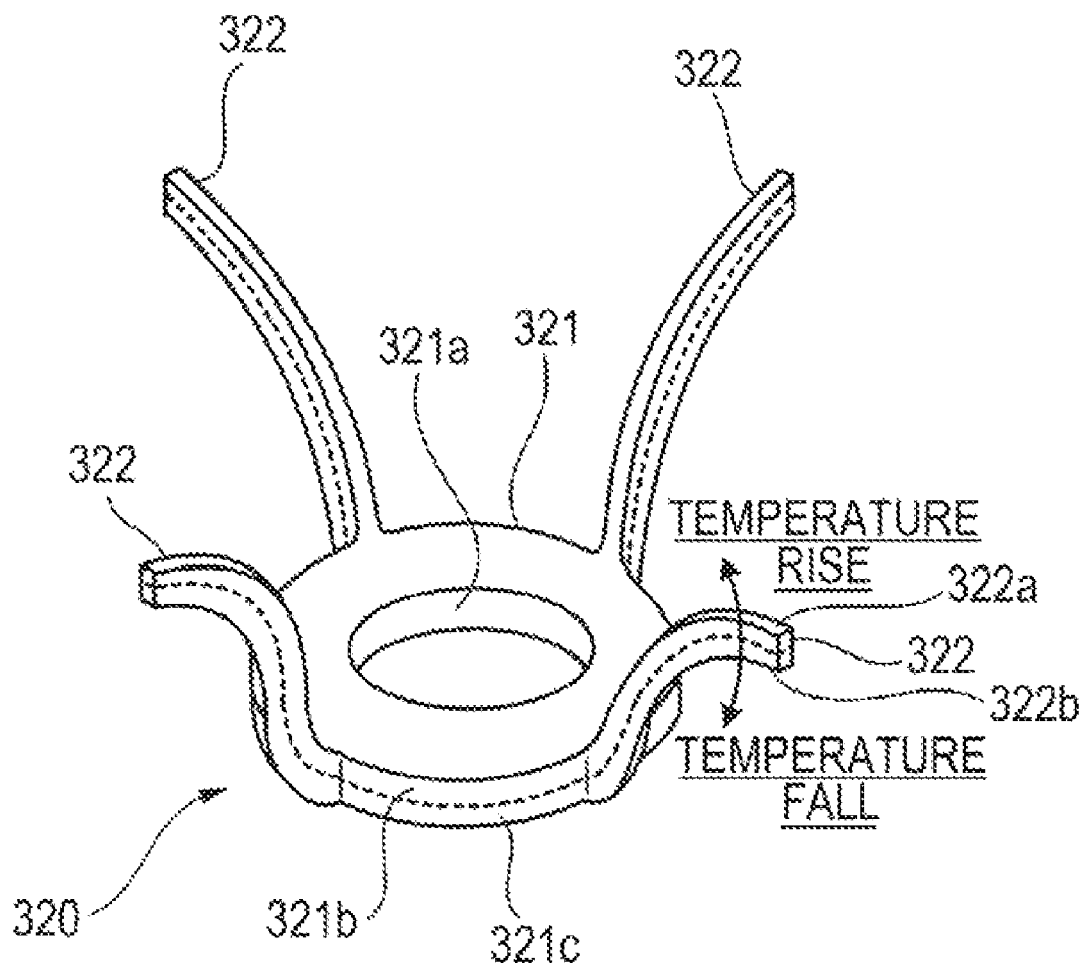
FIG. 15 is a perspective view of a second legged washer.

FIG. 15 is a perspective view of a second legged washer.

The second legged washer 320 includes a washer body 321 and four legs 322.

The washer body 321 is constituted by a disc-shaped plate which has a penetration hole 321a. In the third embodiment, as illustrated in FIG. 13B, an end of the lower spacer 330 on the lower side in FIG. 13B is made to abut against the washer body 321 of the second legged washer 320. Thus, the washer body 321 has a width which is large enough to receive the end of the lower spacer 330. The central penetration hole 321a has a hole diameter which is large enough to receive the screw body 131 of the screw 130.

All the four legs 322, which surround the penetration hole 321a, extend from one of the front and back surfaces of the washer body 321 and curve in directions away from the penetration hole 321a. That is to say, the legs 322 extend from the washer body 321 so that each of the legs 322 get farther from an axis of the washer body 321 with increasing a distance from the washer body 321. The axis of the washer 321 body passes through the penetration hole 321a in a direction perpendicular to the washer body 321.

The second legged washer 320 illustrated in FIG. 15 is also a sheet metal product.

Each of the legs 322 of the second legged washer 320 illustrated in FIG. 15 includes an invar layer 322a on the penetration hole 321a side and a SUS layer 322b on the side opposite to the penetration hole 321a. With this bimetal structure, the legs 322 will further be bent toward the penetration hole 321a as the temperature rises. That is to say, the legs 322 have a characteristic of increasing stress on the circuit board 110 from the legs 322 upon heating the legs 322.

Since the second legged washer 320 is obtained also by processing a sheet metal, the washer body 321 has a bimetal structure similar to those of the legs 322. The washer body 321 has an invar layer 321b on the upper side and a SUS layer 321c on the lower side in FIG. 15. However, also in the second legged washer 320, the deformation of the washer body 321 due to the bimetal structure thereof as the temperature rises is negligibly small.

In the third embodiment with the two legged washers 310 and 320, a decrease in the spring force in the first legged washer 310 at the time of temperature rise is compensated by a proper increase in the spring force in the second legged washer 320 as in the second embodiment. Thus, also in the third embodiment, when the temperature rises, an elastic deformation of the circuit board 110 is allowed while a backlash of the circuit board 110 is avoided effectively.

The lower spacer 330 of the third embodiment corresponds also to one exemplary first spacer in the application described above which includes the second washer and the first spacer. The second legged washer 320 of the third embodiment corresponds also to one exemplary second washer of this application.

In the third embodiment, a distance between the head 131 of the screw 130 and the casing 120 is kept constant by the lower and upper spacers 330 and 340. It is therefore not possible to shorten the distance between the head 131 of the screw 130 and the casing 120 to become shorter than the entire length of the two spacers even after the screw 130 is tightened to the maximum. With this, in the third embodiment, a deformation of the legs of each legged washer caused by the tightened screw 130 is restricted. Thus, damage or the like to the legs by excessive tightening of the screw 130 is avoided effectively.

This indicates that an application described below is preferable. In this application, a second spacer, which is provided integrally with or separately from the casing, is inserted through the penetration hole for the screw-fastening of the circuit board and is disposed between the head of the screw and the casing. The second spacer keeps a distance between the circuit board and the casing constant.

The lower spacer 330 and the upper spacer 340 of the third embodiment altogether correspond to one exemplary second spacer in this application. The lower spacer 330 corresponds to one exemplary first spacer in the application which includes the second washer and the first spacer and also to a part of one exemplary second spacer in the application.

In the third embodiment, two spacers disposed between the screw 130 and the casing 120 are illustrated as one exemplary second spacer in this application, but the second spacer in the application is not limited to the same. The second spacer in this application may alternatively be a single spacer disposed between the screw and the casing.

In the third embodiment, the exemplary second spacer in this application is provided separately from the casing 120, but the second spacer in the application is not limited to the same. The second spacer in this application may alternatively be provided integrally with the casing.

With the third embodiment described above, as in the first and second embodiments, it is possible to suppress the distortion of the circuit board 110 when the circuit board 110 and the casing 120 are subject to the temperature load.

Next, a method for manufacturing a washer according to a fourth embodiment will be described.

FIGS. 16A-16F illustrate a process chart for manufacturing the washer according to the fourth embodiment.

The method for manufacturing the washer illustrated in the process chart includes a cutting-out step (step S10) and a bending step (step S20).

Figure 16A:
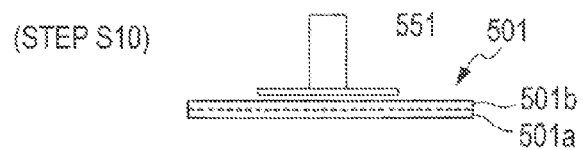
FIGS. 16A-16F illustrate a process chart for manufacturing a washer according to a fourth embodiment.

As illustrated in FIG. 16A, a plate member 501 of a bimetal structure consisting of a SUS layer 501a and an invar layer 501b is prepared, in the cutting-out step (step S10).

Figure 16B:
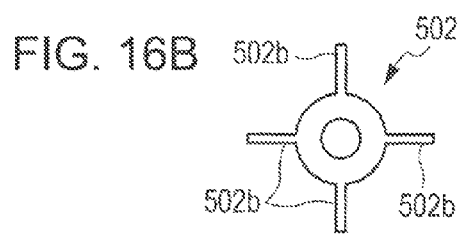

As illustrated in FIG. 16B, a legged metal sheet 502 is cut out of the plate member 501 by using a press jig for cutting 551. The legged metal sheet 502 includes a disk-shaped plate 502a and four legs 502b. The disk-shaped plate 502a includes a penetration hole. The four legs 502b extend radially outward from an outer edge of the disk-shaped plate 502a. In the present embodiment, as the press jig for cutting 551, jigs of various configurations and dimensions are prepared for various types of legged washers to be manufactured.

Figure 16C:
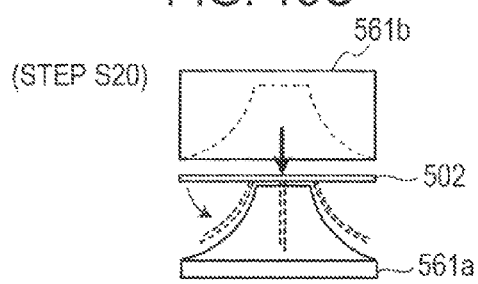
Figure 16E:
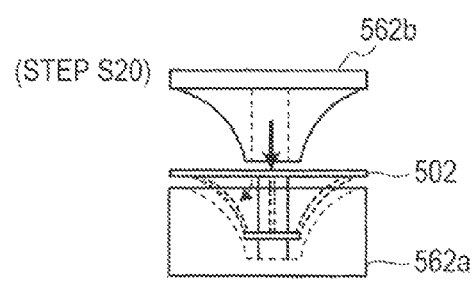

As illustrated in FIGS. 16C and 16E, each of the legs 502b of the cut out legged metal sheet 502 is bent at a boundary with the disk-shaped plate 502a and is curved in a direction away from the penetration hole by using a press jig for formation under pressure, in the bending step (step S20). In the present embodiment, the following two types of press jigs are prepared as the press jig for formation under pressure.

A first press jig illustrated in FIG. 16C includes a receiving member 561a and a press member 561b which will be described below. The receiving section 561a has a conical shape of which side surface is formed as a concave wall that is necessary for the formation of the legs 502b. A top of the receiving member 561a is formed as a circular plane on which the disk-shaped plate 502a is placed. The press member 561b includes a mortar-shaped recess which receives the receiving member 561a. In the bending step (step S20) using the first press jig, the disk-shaped plate 502a of the legged metal sheet 502 is first placed on the top of the receiving member 561a. Next, the press member 561b is moved down from above the legged metal sheet 502 and the legged metal sheet 502 is disposed between the receiving member 561a and the recess of the press member 561b. Then, the legs 502b are bent at the top edge of the receiving member 561a, which corresponds to the boundary of the disk-shaped plate 502a and the legs 502b. At the same time with the bending step, the legs 502b are curved along the side surface of the receiving member 561a and along the recessed configuration of the press member 561b.

Figure 16D:
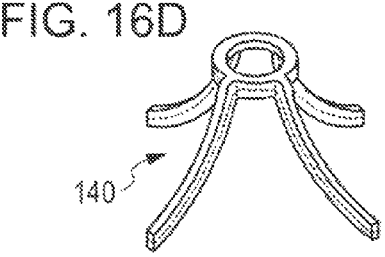
Figure 16F:
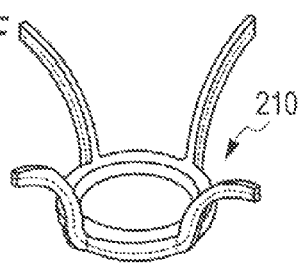

With these steps, the first legged washer 140 illustrated also in FIG. 3 and the second legged washer 210 illustrated also in FIG. 12 are completed. The first legged washer 140 and the second legged washer 210 are also illustrated in FIGS. 16D and 16F.

Note that the legged metal sheet 502 is placed on the receiving member 561a in different manners in the manufacture of the first legged washer 140 and the second legged washer 210.

In the manufacture of the first legged washer 140 which has the SUS layer 142a on the penetration hole side of the legs 142 as illustrated in FIG. 3, the legged metal sheet 502 is placed on the receiving member 561a with the SUS layer 501a facing the receiving member 561a.

However, in the manufacture of the second legged washer 210 which has the invar layer 212a on the penetration hole side of the legs 212 as illustrated in FIG. 12, the legged metal sheet 502 is placed on the receiving member 561a with the invar layer 501b facing the receiving member 561a.

In the present embodiment, as the first press jig, jigs of various configurations and dimensions are prepared for various types of legged washers to be manufactured.

A second press jig illustrated in FIG. 16E includes a receiving member 562a and a press member 562b. The receiving member 562a has a shape similar to the press member 561b of the first press jig. The press member 562b has a shape similar to the receiving member 561a of the first press jig. A circular column which fits in the penetration hole of the disk-shaped plate 502a of the legged metal sheet 502 is provided to stand upright at the center of the mortar-shaped recess of the receiving member 562a of the second press jig. The press member 562b of the second press jig includes a hole extending inwardly from the conical top thereof to receive the circular column. In the bending step (step S20) using the second press jig, the disk-shaped plate 502a of the legged metal sheet 502 is first placed on the receiving member 562a with the distal end of the circular column penetrating the penetration hole of the disk-shaped plate 502a. Then, the press member 562b is moved down from above the legged metal sheet 502 with the circular column fit into the hole. With this downward movement, the legs 502b are bent and curved.

When the second press jig is used, the legged metal sheet 502 is placed on the receiving member 562a in a reversed manner of the case in which the first press jig is used. That is, in the manufacture of the first legged washer 140, the legged metal sheet 502 is placed on the receiving member 562a with the invar layer 501b facing the receiving member 562a. On the other hand, in the manufacture of the second legged washer 210, the legged metal sheet 502 is placed on the receiving member 562a with the SUS layer 501a facing the receiving member 562a.

In the present embodiment, as the second press jig, jigs of various configurations and dimensions are prepared for various types of legged washers to be manufactured.

According to the method for manufacturing a washer of the present embodiment described above, various types of legged washers that can suppress the distortion of the circuit board when the circuit board and the casing are subject to the temperature load can be provided.

FIGS. 16D and 16F illustrate the first legged washer 140 of FIG. 3 and the second legged washer 210 of FIG. 12 as legged washers to be manufactured. These legged washers are illustrative only and it should be noted that the first legged washer 310 of FIG. 14 and the second legged washer 320 of FIG. 15 can be obtained by the method for manufacturing illustrated in FIGS. 16A-16F.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An electronic device comprising:
   a circuit board including a through hole passing through the circuit board;
   a member including a screw hole corresponding to the through hole;
   a screw including a screw body having an outer diameter smaller than an inner diameter of the through hole and a screw head having an outer diameter larger than the inner diameter of the through hole, wherein the screw body penetrates through the through hole to engage with the screw hole and the screw head is disposed on an opposite side of the circuit board to the member; and
   a first washer provided between the screw head and the circuit board, the first washer including a first body and a plurality of first legs extending from the first body toward the circuit board, the first legs being in contact with the circuit board and comprising a bimetal structure, the first body and the first legs being seamlessly integrated.

2. The electronic device according to claim 1, wherein the first legs extend from the first body so that each end of the first legs gets farther from an axis of the first body with increasing a distance from the first body, the axis being perpendicular to the circuit board.

3. The electronic device according to claim 1, wherein the number of the first legs is no less than three.

4. The electronic device according to claim 1, wherein the first washer is formed by sheet-metal working.

5. The electronic device according to claim 1, further comprising:
   a second washer provided between the member and the circuit board, the second washer including a second body and a plurality of second legs extending from the second body toward the circuit board, the second legs being in contact with the circuit board and comprising a bimetal structure; and
   a spacer provided between the member and the circuit board.

6. The electronic device according to claim 5, wherein the second legs extend from the second body so that each end of the second legs gets farther from an axis of the second body with increasing a distance from the second body, the axis being perpendicular to the circuit board.

7. The electronic device according to claim 1, further comprising:
   a spacer provided between the screw head and the circuit board.

8. A washer through which a screw penetrates, the washer comprising:
   a body; and
   a plurality of legs extending from the body toward a side of the body and each having a curve so that each end of the legs gets farther from an axis of the screw with increasing a distance from the body, the legs comprising a bimetal structure, the body and the legs being seamlessly integrated.

9. The washer according to claim 8, wherein the number of the legs is no less than three.

10. The washer according to claim 8, wherein the body and the legs are formed by sheet-metal working.

11. A method for manufacturing a washer through which a screw penetrates, the method comprising:
   forming a plate including a body portion and a plurality of leg portions extending from the body portion, the plate having a characteristic of curving on a side of the plate upon being heated; and
   bending the leg portions on the side or the other side of the plate,
   wherein the leg portions comprise a bimetal structure, and the body portion and the leg portions are seamlessly integrated.

12. The method for manufacturing the washer according to claim 11, wherein in the bending the leg portions, bending the leg portions so that each end of the leg portions gets farther from an axis of the screw with increasing a distance from the body portion.

13. The method for manufacturing the washer according to claim 11, wherein the number of the leg portions is no less than three.

* * * * *